(12) United States Patent
Last et al.

(10) Patent No.: US 10,191,938 B2
(45) Date of Patent: Jan. 29, 2019

(54) EDITING OF VOLUME OF DATA

(71) Applicants: Holger Last, München (DE); Christof Störmann, München (DE); Stefan Hagen Weber, München (DE)

(72) Inventors: Holger Last, München (DE); Christof Störmann, München (DE); Stefan Hagen Weber, München (DE)

(73) Assignee: Siemens Aktiengesellschaft, München (DE)

( * ) Notice: Subject to any disclaimer, the term of this patent is extended or adjusted under 35 U.S.C. 154(b) by 107 days.

(21) Appl. No.: 14/404,322

(22) PCT Filed: Mar. 25, 2013

(86) PCT No.: PCT/EP2013/056203
§ 371 (c)(1),
(2) Date: Nov. 26, 2014

(87) PCT Pub. No.: WO2013/178376
PCT Pub. Date: Dec. 5, 2013

(65) Prior Publication Data
US 2015/0339345 A1    Nov. 26, 2015

(30) Foreign Application Priority Data

May 29, 2012    (DE) .................. 10 2012 208 999

(51) Int. Cl.
G06F 7/02        (2006.01)
G06F 17/30       (2006.01)
G06N 99/00       (2010.01)

(52) U.S. Cl.
CPC .. G06F 17/30398 (2013.01); G06F 17/30389 (2013.01); G06F 17/30395 (2013.01); G06N 99/005 (2013.01)

(58) Field of Classification Search
CPC ......... G06F 17/30554; G06F 17/30398; G06F 17/30247; G06F 3/0488; G06F 17/30277;
(Continued)

(56) References Cited

U.S. PATENT DOCUMENTS 5,734,888 A * 3/1998 Li ..................... G06F 17/30395
7,328,220 B2   2/2008 Dobra et al.
(Continued)

FOREIGN PATENT DOCUMENTS

CN    101093559 A    12/2007
CN    101201840 A    6/2008
(Continued)

OTHER PUBLICATIONS

"Matching Forensic Sketches to Mug Shot Photos," Klare et al, IEEE, Mar. 2011.*
(Continued)

*Primary Examiner* — Bruce M Moser
(74) *Attorney, Agent, or Firm* — Lempia Summerfield Katz LLC

(57) ABSTRACT

At least one hit in a large volume of data is found using a graphical search pattern. The graphical search pattern is created afresh or modified by a user using a graphical interface. The user may implement complex searches and use a graphical representation of properties and/or correlations for the search in a directed manner. The method may be used, for example, in data mining, in the monitoring of states, or in automated alerting.

19 Claims, 3 Drawing Sheets

(58) Field of Classification Search
CPC ........ G06F 17/30389; G06F 17/30395; G06N 99/005

See application file for complete search history.

(56) References Cited

U.S. PATENT DOCUMENTS

| | | | |
|---|---|---|---|
| 7,469,226 B2* | 12/2008 | Escher | G06Q 40/025 705/36 R |
| 7,664,830 B2 | 2/2010 | Rising, III | |
| 8,165,406 B2 | 4/2012 | Tan et al. | |
| 8,571,327 B2 | 10/2013 | Sacher et al. | |
| 8,988,347 B2* | 3/2015 | Iwase | G06F 1/1626 345/158 |
| 9,008,446 B2 | 4/2015 | Tan et al. | |
| 2008/0263036 A1 | 10/2008 | Yamamoto | |
| 2011/0131235 A1* | 6/2011 | Petrou | G06F 17/30277 707/769 |
| 2011/0219352 A1* | 9/2011 | Majumder | G06F 17/50 716/139 |
| 2012/0266074 A1* | 10/2012 | Bhoovaraghavan | G06F 11/32 715/738 |
| 2012/0283574 A1* | 11/2012 | Park | G06K 9/46 600/476 |
| 2012/0294520 A1* | 11/2012 | Mei | G06K 9/00335 382/164 |

FOREIGN PATENT DOCUMENTS

| | | |
|---|---|---|
| CN | 101529481 A | 9/2009 |
| CN | 101896901 A | 11/2010 |
| WO | WO03088085 A1 | 10/2003 |
| WO | WO2004068300 A2 | 8/2004 |

OTHER PUBLICATIONS

"Free-Hand Sketch Grouping for Video Retrieval," Collomosse et al, ICPR 2008.*
Kurlander et al, "Graphical Search and Replace," Computer Graphics, vol. 22 No. 4, Aug. 1988 (Year: 1988).*
Andreas D. Blaser et al: "A Visual Tool for Querying Geographic Databases"; ACM; Penn Plaza; Suite 701; pp. 211-216; XP040114226; 2000; US; May 24, 2000.
Charles E Jacobs et al: "Fast Multiresolution Image Querying"; IEEE; pp. 277-286; XP000546238; ISBN: 978-0-89791-701-8; 1995; US; Aug. 6, 1995.
Daniel Keim et al: "Visual Analytics: Definition, Process, and Challenges"; Springer Berlin Heidelberg pp. 154-175; XP019092989; ISBN: 978-3-540-70955-8; 2008; DE; Jul. 19, 2008.
German Office Action for German Application No. 10 2012 208 999.3, dated Jan. 29, 2015, with English Translation.
Internet:http://de.wikipedia.org/wiki/Heatmap; 2012.
Internet:http:_//de.wikipedia.org/wiki/Data-Mining; May 2012.
Internet:http:_//de.wikipedia.org/wiki/visual_analytics; May 2012.
Martin Wattenberg; "Sketching a Graph to Query a Time-Series Database"; smartmoney.com; p. 381; XP055094632; DOI:10.1145/634288.634292; 2001; US; Jan. 1, 2001.
PCT International Search Report and Written Opinion of the International Searching Authority dated May 9, 2014 for corresponding PCT/EP2013/056203.
Sousa P et al: "Geometric Matching for Clip-Art Drawing Retrievel"; Journal of Visual Communication and Image Representation; Academic Press; vol. 20 No. 2; pp. 71-83; XP025941894; ISSN: 1047-3203;DOI:10.1016/J.JVCIR.; 2009; US; Feb. 1, 2009.
A. Blaser et al, "A visual tool for querying geographic databases", Advanced Visual Interfaces—AVI 2000, Palermo, Italy, 9 pages (May 2000).
Chinese Office Action for related Chinese Application No. 201380028056.1 dated Nov. 30, 2016, with English Translation.

* cited by examiner

FIG 1B
FIG 1C
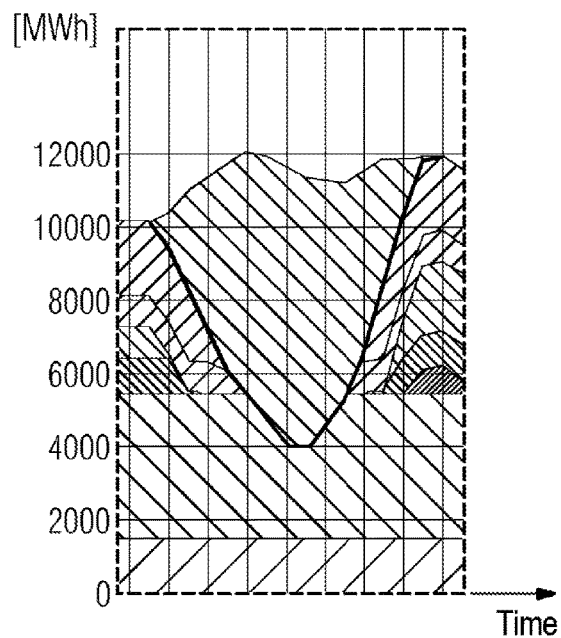

EDITING OF VOLUME OF DATA

RELATED APPLICATIONS

This application is the National Stage of International Application No. PCT/EP2013/056203, filed Mar. 25, 2013, which claims the benefit of German Patent Application No. DE 102012208999.3, filed May 29, 2012. The entire contents of both documents are hereby incorporated herein by reference.

TECHNICAL FIELD

The present teachings relate generally to methods, devices, and systems for editing a large volume of data and, in some embodiments, to methods, devices, and systems for finding at least one hit in the volume of data.

BACKGROUND

Information technologies are increasingly prevalent in society, and produce a flood of data and information. A growing challenge is to make the knowledge contained in these data usable for different applications.

Data mining (e.g., extracting something valuable from a mountain of data) refers to the systematic application of primarily statistical/mathematical methods to a database with the aim of recognizing new patterns. Data mining may involve the processing of very large databases (e.g., databases that may not be manually processed) using efficient methods having a time complexity suitable for large volumes of data. However, the methods may also be applied to smaller volumes of data. In practice, the phrase "data mining" is used in the "knowledge discovery in databases" (KDD) process. The KDD process also includes preprocessing (e.g., http://de.wikipedia.org/wiki/Data-Mining).

In practice, data mining may raise a false expectation that interesting knowledge will be automatically extracted (e.g., without a substantial contribution from the user) via an approach known as "unsupervised machine learning"

In recent decades, a plurality of algorithms have been developed that may extract interesting sub-aspects from large volumes of data. However, the interesting knowledge that may be automatically extracted may correspond to relatively simple aspects in the data (e.g., frequent patterns, specific clusters and structures that are searched for and in some cases found). The user is responsible for the interpretation and evaluation of the quality of the algorithmically extracted knowledge.

Furthermore, an interaction with the user may be needed. For example, an algorithm for anomaly recognition may be based on an advance definition of normal behavior or the provision of normal data by the user in an approach referred to as "supervised machine learning" or "active learning." The more complex that the demands made on a data mining system are, the more elaborate is the design of the interaction with the user.

One problem is being able to provide a suitable facility for communication between the user and the machine (e.g., in the form of a man-machine interface). The reason is that a discrepancy may exist between the machine-extracted information and the knowledge usable for the person. For example, model parameters may be influenced interactively in order to successively maximize the proportion of usable knowledge. Large volumes of data with complex correlations may pose considerable challenges to system performance.

Visual analytics (VA) is an interdisciplinary approach that combines different research fields. The aim of the VA method is to acquire knowledge from large and complex datasets. The approach combines the strengths of automatic data analysis with human capabilities for visually recognizing patterns or trends quickly. Data may be visually explored and knowledge acquired through suitable interaction mechanisms (e.g., http://de.wikipedia.org/wiki/Visual_Analytics).

The interaction on the graphical representation of conventional VA systems involves selecting interesting patterns that are already present in the data. However, the user is restricted to already existing patterns and is not allowed further flexibility.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, an efficient facility is provided for searching for information in large volumes of data.

A method for editing a volume of data (e.g., for searching for hits in a large volume of data) includes creating a graphical search pattern, converting the search pattern into at least one query, and applying the query to a volume of data.

Automatic pattern recognition based on an interactively produced, visual search query is thus provided. The user may select an existing pattern as a search pattern, create or modify a search pattern on existing data, or create a search pattern without a template and adapt the search pattern as desired. The graphical search pattern creates for the user a simple access to complex query structures that may be simply recognized and modified. The graphical patterns are translated into the at least one query and are applied to the volume of data. Hits based on the graphical search pattern may thus be found.

The creation of the search pattern may also include a modification of existing data or of an already existing search pattern.

In some embodiments, the search pattern is created via a graphical user interface. The graphical user interface may include, for example, a graphical editor.

In some embodiments, the search pattern is created by a two-dimensional or three-dimensional scanner and/or by at least one camera.

For example, movements or interactions of the user with the machine may be recorded and converted into a modification of the search pattern. The user may thus virtually model data by a camera and/or by a scanner and may thus adapt the graphical search pattern as desired.

In some embodiments, the search pattern is created on the basis of data of the volume of data or other data and/or based on at least one other search pattern.

In some embodiments, the search pattern is converted into at least one query by converting the graphical representation of the search pattern into rules, conditions, and/or states.

In some embodiments, the method is employed iteratively, such that the search pattern is created (e.g., modified) in each iteration.

In some embodiments, the query is applied to a volume of data and at least one hit is defined in the volume of data.

In some embodiments, the query is applied to a volume of data and a predefined action is carried out if a hit matching the search pattern has been determined.

The matching hit may have a predefined similarity (e.g., a minimum measure of a similarity with the search pattern).

In some embodiments, the predefined action includes at least one message, display, and/or alert.

The present teachings may thus be used for automated monitoring applications. For example, an automated alerting may be effected based on recognition of trends and configurations for identifying malfunctions of a network or the like.

In some embodiments, the query is applied to a volume of data and the hits most closely matching the search pattern are defined. The hits may be represented or referenced in a predefined sequence (e.g., according to a quality of the match with the search pattern).

In some embodiments, the search pattern is converted into at least one query, and the search pattern is scaled and/or normalized. The normalization may include a shortening and/or lengthening of the time interval.

In some embodiments, properties of the search pattern are extracted. The extracted properties are at least partially represented as modifiable parameters. The extracted properties extend the interface between the machine and the user. The user may, for example, graphically modify the properties of the search pattern, and obtain (e.g., on completion of the search) a display of an update of the hits.

In some embodiments, the search pattern and/or the query is employed as a target function for a machine-learning method. For example, the search pattern may be employed to search for similar patterns to mark areas (e.g., clusters) in the volume of data (or a part thereof).

A device for editing a volume of data includes a processing unit that is configured to create a graphical search pattern, convert the search pattern into at least one query, and apply the query to a volume of data.

A system includes at least one device of a type described above.

The above description relating to methods in accordance with the present teachings also applies to devices and systems in accordance with the present teachings.

A computer program product configured to be loaded into a memory of a digital computer includes program code parts that are configured to carry out acts of the methods described herein.

A computer-readable storage medium (e.g., any memory) includes instructions executable by a computer (e.g., in the form of program code) for carrying out acts of the methods described herein.

BRIEF DESCRIPTION OF THE DRAWINGS

Analogous or identical elements may be denoted using the same reference characters.

FIG. 1B shows an extract of the exemplary volume shown in FIG. 1A.

FIG. 1C shows an exemplary graphical search pattern that has been modified by a user using a graphical interface (e.g., an editor).

DETAILED DESCRIPTION

Figure 1A:
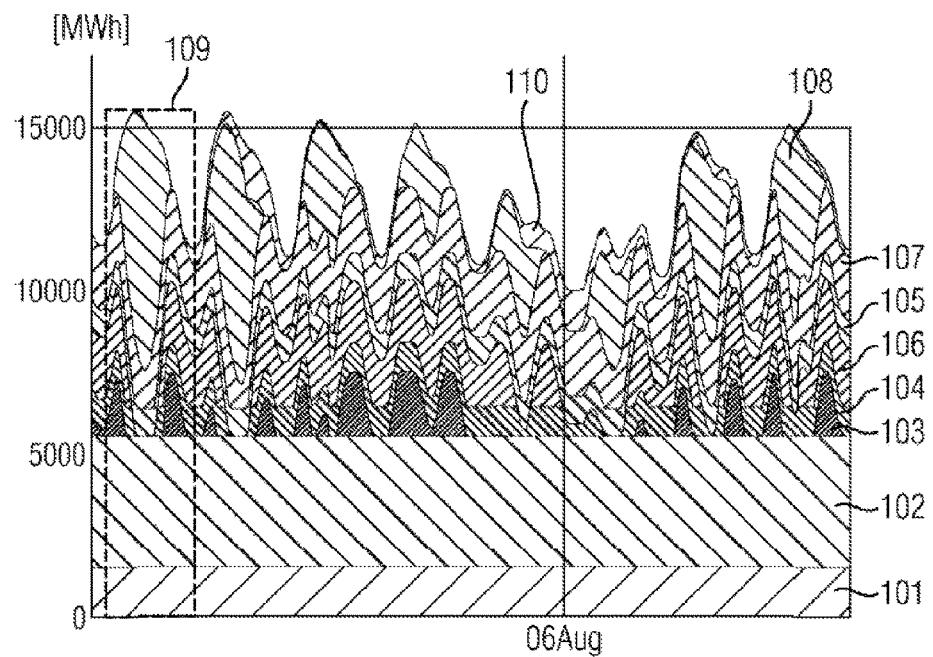
FIG. 1A shows an exemplary volume of data that indicates a total provided power in megawatt hours (MWh) over a time axis.

In accordance with the present teachings, a search pattern may be defined (e.g., by an editing process) based on similar patterns from existing data or other parameters.

A graphical search pattern may be edited and/or created (e.g., via a graphical editor).

The search pattern thus defined (e.g., edited or adapted) may or may not be identical to the data that the user seeks to find in a volume of data (e.g., a multiplicity of data or a database).

In contrast to conventional systems, the user has the facility to define a subset of existing data by graphical editing (e.g., by drawing a frame).

The user may therefore generate and/or modify a search pattern in a targeted manner as desired. The user is no longer reliant on first finding in the data the search pattern to be applied before applying the search pattern to the volume of data or to the further data.

The search pattern may be a graphical pattern that is entered or modified (e.g., via a graphical editor) by data points and/or in the form of a freehand drawing. Different input facilities may be implemented accordingly. Thus, the graphical pattern may also be drawn on a sheet and digitized. Two-dimensional or higher-dimensional patterns may be used. Moreover, the user may employ two-dimensional or higher dimensional patterns to custom design a more efficient search in the volume of data.

The search pattern is entered and/or modified and stored by a pattern input. A stored search pattern may be used repeatedly or further modified.

The pattern input may involve the graphical editor, a graphical user interface, a two-dimensional or three-dimensional scanner, a camera, or the like.

One or more of the following aims may be pursued or achieved with the search pattern. First, a delimitation (e.g., drilldown) to data that are identical to the search pattern or that have a predefined similarity with the search pattern may be effected. For example, a measure of a correspondence between the search pattern and found data may be defined and output. The hits in the data may be displayed and sorted according to their correspondence (e.g., the measure).

Second, a representative search pattern is defined by normalizing the search pattern in an automated manner using the volume of data in order to increase the frequency of the hits within the volume of data. A normalization of this type may include, for example, a shortening and/or a lengthening of the time interval.

Third, properties of the search pattern may be extracted. These extracted properties extend the interface between the machine and the user. The user may, for example, graphically modify the properties of the search pattern and obtains a display of an update of the hits.

Fourth, the search pattern may be used as a target function for machine-learning methods. For example, the search pattern may be used to search for similar patterns, or to mark areas (e.g., clusters) in an existing database.

Fifth, the search pattern may be employed (e.g., as a machine-learnt search pattern) in monitoring applications. For example, an automated alerting may be effected upon recognition of specific trends and configurations for identifying malfunctions of a network or the like.

EXAMPLE

Interactive Search in Energy Data

For example, in order to analyze or optimize national and/or regional power generation, an expansion of alternative energy sources may be examined more closely in terms of different optimization objectives (e.g., costs, $CO_2$ emission, or the like).

The analysis is carried out for large volumes of data that may also contain weather data and consumer data for any given location. Systematic manual searches would be hugely time-consuming, error-prone, and in some instances—even if theoretically feasible—impracticable.

For example, to determine when and where solar energy may replace nuclear energy, a mix of energy sources may be investigated. A determination may be made as to whether there are circumstances in a region at any time wherein a required energy form (e.g., solar energy) or a mix with solar energy may replace the basic load of the energy supply (e.g., hydroelectric power and nuclear power).

For example, the energy forms may include solar power, wind power, nuclear power, biomass, oil, gas, hydroelectric power, gas and steam (GaS), and coal.

The user is provided with a search pattern that may be graphically defined or selected in graphical form and modified as needed.

FIG. 1A shows an extract from an exemplary volume of data that indicates the provided total power in MWh over a time axis. The following energy forms are shown in FIG. 1A: hydroelectric power 101, nuclear power 102, oil 103, GaS 104, coal 105, gas 106, biomass 107, solar power 108, and wind power 110.

The user may graphically define a search pattern. Alternatively, the user may select an extract 109 from the diagram shown in FIG. 1A. The extract 109 is shown again in FIG. 1B and corresponds to a random sample from the volume of data that serves as an initial basis for the search pattern.

FIG. 1C shows an exemplary search pattern that has been modified graphically (e.g., with an editor) by the user. The statement linked to the search pattern reads: "solar power 108 replaces nuclear power 102."

The search pattern may now be used to find hits in the volume of data that correspond to the above-described statement (e.g., with a predefined minimum similarity). Hits that are identical to the search pattern may be found. In addition, partial data having a predefined minimum similarity with the search pattern may also be identified as hits.

Figure 2:
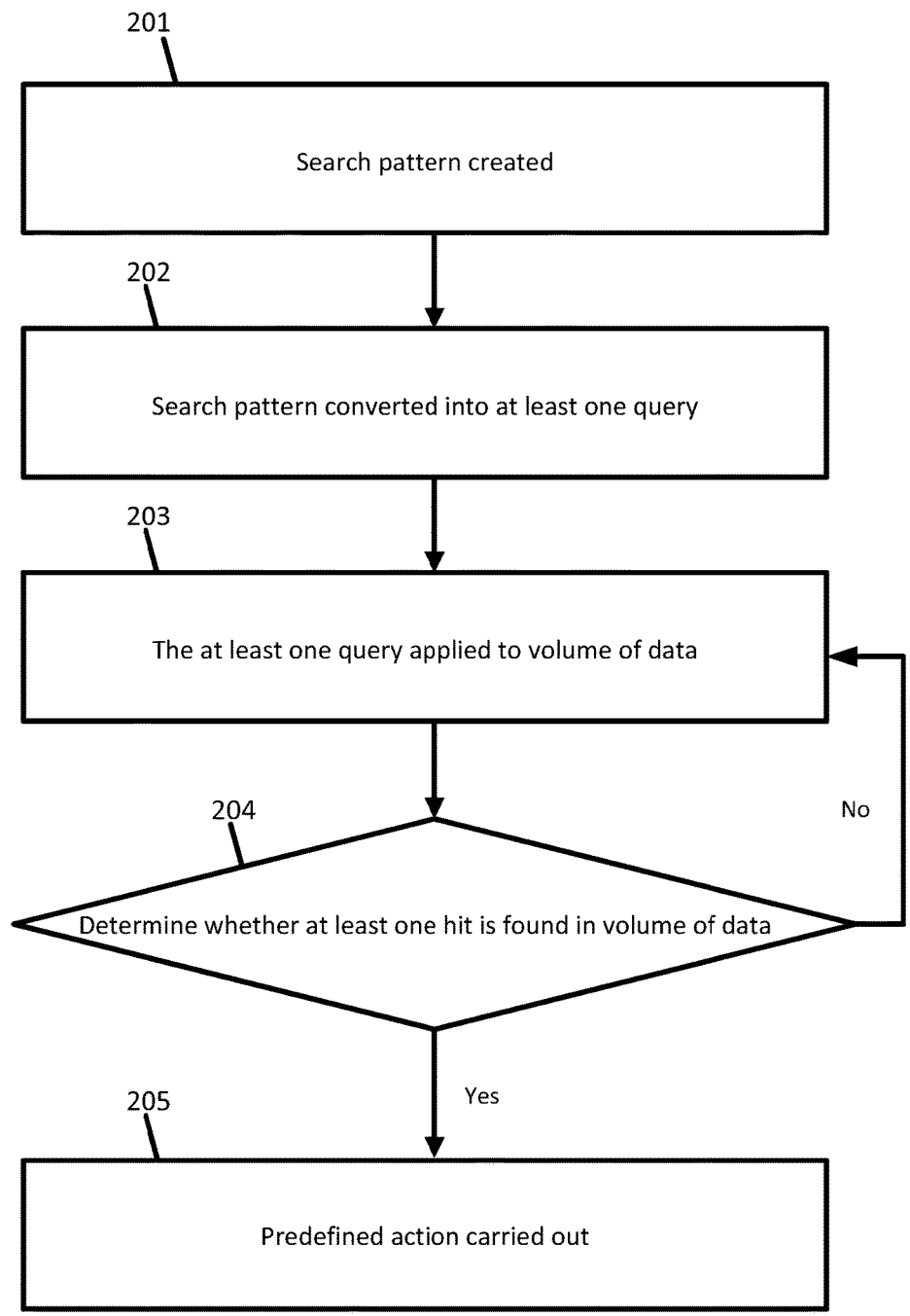
FIG. 2 shows a schematic flow diagram of representative acts in an exemplary method as described herein.

FIG. 2 shows a schematic flow diagram of exemplary acts of a method in accordance with the present teachings.

In act 201, a search pattern is created, for example, based on existing data or existing search patterns. Alternatively, the search pattern may also be created without a template. The creation may include a modification or a new creation. For example, a graphical user interface or a graphical input medium may be used.

In act 202, the search pattern is converted into at least one query and, in act 203, the at least one query is applied to the volume of data.

Optionally (not shown in FIG. 2), in a further act, the hit or hits may be output and, if desired, prioritized. The method may then return to act 201.

In act 204, a determination is made as to whether at least one hit has been found in the volume of data. A hit may be a part of the volume of data that has a predefined minimum similarity with the search pattern. If a hit has been found, a predefined action is carried out (e.g., an alarm is triggered) in act 205. The method may then return to act 203, or, as shown in FIG. 2, to act 201.

If no hit is defined in act 204, the method may return to act 203.

Example of a Process/Workflow

The interactive search may be used in conjunction with a visual analytics system. A process may include, for example, at least some of the following acts.

First, optionally, an evaluation of data and presentation of the results may occur and there may be an interaction with the evaluation/presentation of the data. The data are based on the volume of data (e.g., database) or on already existing search patterns.

Second, a search pattern may be defined (e.g., by graphical input). The search pattern may be entered via any graphical user interface. Rules are defined based on the search pattern and are implemented, for example, in the form of a query by the machine The data or search pattern may be displayed in a suitable form. The user may be given different interaction facilities (e.g., for selection) for modifying the search pattern or for drawing new search patterns.

Third, a query to the system may be based on the search pattern.

Fourth, the query may be edited by the system. In the editing of the query by the system, the search pattern is machine-converted (e.g., "translated") into information that describes the search pattern. This information is used to carry out a machine search. The selection of a similarity measure that allows data that are similar to the search pattern to be found in the volume of data is effected. Examples of similarity measures include Pearson coefficient, cosine similarity, and the like. The similarities are calculated (e.g., distances between the search pattern and data of the volume of data). The N most similar hits may optionally be grouped. The hits may be sorted according to their quality (e.g., similarity) with, for example, the best hits being displayed first. A threshold value (e.g., alerting value) may be predefined. If the similarity reaches or exceeds the threshold value, a predefined action may be carried out. A plurality of threshold values may also be defined and checked and/or linked to a plurality of predefined actions. In this way, an alarm may be triggered (or instigate a different predefined action) in an automated manner when the search pattern has been found with a predefined quality in the data. A distribution of the found similar hits may be calculated.

Fifth, the results may be processed. The hits (e.g., patterns) are displayed. The groups (e.g., clusters) of hits may optionally be displayed. A distribution of the found hits is displayed in the relevant or in predefined dimensions. A ranking of the hits may be displayed as a heat map, wherein a color scale may optionally be used for each grouping.

A heat map is a diagram for visualizing data. The dependent values of a two-dimensional definition quantity are represented as colors. The heat map facilitates the intuitive and fast acquisition of significant values in a large volume of data (e.g., http://de.wikipedia.org/wiki/Heatmap).

In accordance with the present teachings, an improved interaction between the user and the system may be provided. Due to fundamental modification facilities beyond the customary marking and demarcation, the user obtains the facility to define a search query on a large volume of data by a visual search pattern. In a flexible manner, a "visual query" may be implemented that is automatically converted by the machine into a query for the volume of data.

The user may thus flexibly and intuitively define parameters for the search query. A powerful search tool is provided, for example, by the visual two-dimensional or three-dimensional (e.g., including color) description of the search pattern.

The user may align the search pattern more closely as desired such that fewer iterations are involved in the search for the data in the large volume of data.

Specific patterns that occur only indicatively, or not at all, in the data may be defined. Due to the search for data that are similar to the search pattern, the highly promising hits may be found.

The methods described herein are suitable for a multiplicity of applications (e.g., monitoring large volumes of data, providing alerts if complex scenarios occur or prior to occurrence). Thus, in the context of the energy system design in a real-time monitoring, search patterns may be defined that occur only in extreme situations (e.g., shortly before a blackout in the power distribution network).

For example, the search patterns may involve space-time data of a geodatabase.

Thus, at least one hit may be found in a large volume of data using a graphical search pattern. The graphical search pattern is newly created or modified by a user (e.g., via a graphical interface). The user may implement complex searches intuitively and may use a graphical representation of properties and/or correlations for the search in a targeted manner. The present teachings may be used, for example, in data mining, in the monitoring of states, or in automated alerting.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for editing a volume of data, the method comprising:
    displaying, via a graphical user interface, a subset of the volume of data as a plurality of pre-existing graphical patterns, the plurality of pre-existing graphical patterns representing data points of magnitude over time;
    selecting, from the displayed subset of the volume of data, a portion of the plurality of pre-existing graphical patterns of the subset of the volume of data, the portion representing a temporal range of data points;
    modifying, via the graphical user interface, at least one pre-existing graphical pattern of the selected portion of the plurality of pre-existing graphical patterns in relation to at least one other pre-existing graphical pattern of the selected portion of the plurality of pre-existing graphical patterns;
    defining, by a processor, a first graphical search pattern with the at least one other pre-existing graphical pattern and the modified at least one pre-existing graphical pattern of the plurality of pre-existing graphical patterns of the selected portion of the subset of the volume of data;
    generating at least one query based on the first graphical search pattern;
    applying the at least one query to the volume of data;
    determining whether the at least one query results in at least one hit in the volume of data that matches the first graphical search pattern; and
    carrying out a predefined action when the at least one hit is determined or modifying the at least one query when the at least one hit is not determined.

2. The method of claim 1, wherein the first graphical search pattern is defined by a scanner, at least one camera, or the scanner and the at least one camera, wherein the scanner is a two-dimensional scanner or a three-dimensional scanner.

3. The method of claim 1, wherein the first graphical search pattern is defined based on at least one other search pattern.

4. The method of claim 1, wherein generating the at least one query comprises converting the first graphical search pattern into rules, conditions, states, or combinations thereof.

5. The method of claim 1, further comprising employing the method iteratively such that a graphical search pattern is created in each iteration.

6. The method of claim 1, wherein the predefined action comprises a message, a display, an alert, or combinations thereof.

7. The method of claim 1, further comprising defining hits that match the first graphical search pattern by an amount.

8. The method of claim 7, wherein the hits are represented in a predefined sequence according to a quality of the match with the first graphical search pattern.

9. The method of claim 1, wherein the first graphical search pattern is scaled, normalized, or scaled and normalized.

10. The method of claim 1, further comprising extracting properties of the first graphical search pattern, wherein the extracted properties are at least partially represented as modifiable parameters.

11. The method of claim 1, further comprising employing the first graphical search pattern, the query, or the first graphical search pattern and the query as a target function for a machine-learning method.

12. The method of claim 1, wherein selecting a portion of the plurality of pre-existing graphical patterns of the subset of the volume of data comprises graphically selecting, via the graphical user interface, the portion of the plurality of pre-existing graphical patterns from a graphical representation of the subset of the volume of data.

13. The method of claim 1, further comprising creating a second graphical search pattern based on the first graphical search pattern,
    wherein generating the at least one query comprises converting the second graphical search pattern into the at least one query.

14. The method of claim 1, wherein the at least one hit is determined based on a predefined similarity measure.

15. The method of claim 14, wherein the similarity measure includes the Pearson coefficient, a cosine similarity, or any combination thereof.

16. The method of claim 1, wherein determining whether the at least one query results in the at least one hit in the volume of data that matches the first graphical search pattern comprises determining, by the processor, whether the at least one hit meets or exceeds a predetermined threshold value.

17. A device for editing a volume of data, the device comprising:

a processing unit configured to:
- display a subset of the volume of data as a plurality of pre-existing graphical patterns, the plurality of pre-existing graphical patterns representing data points of magnitude over time;
- select a portion of the plurality of pre-existing graphical patterns of the subset of the volume of data, the portion representing a temporal range of data points;
- modify a first pre-existing graphical pattern of the selected portion of the plurality of pre-existing graphical patterns in relation to another pre-existing graphical pattern of the selected portion of the plurality of pre-existing graphical patterns;
- define a graphical search pattern using the modified pre-existing graphical pattern in relation to the other pre-existing graphical pattern of the selected portion of the plurality of pre-existing graphical patterns of the subset of the volume of data;
- generate at least one query based on the graphical search pattern;
- apply the at least one query to the volume of data; and
- carry out a predefined action when the at least one query results in at least one hit in the volume of data or modify the at least one query when the at least one query does not result in at least one hit in the volume of data.

18. A system comprising at least one device configured for editing a volume of data, the device comprising:
- a processing unit configured to display a subset of the volume of data as a plurality of pre-existing graphical patterns, the plurality of pre-existing graphical patterns representing data points of magnitude over time, select a portion of the plurality of pre-existing graphical patterns of the subset of the volume of data, define a graphical search pattern using the selected portion of the plurality of pre-existing graphical patterns of the subset of the volume of data, generate at least one query based on the graphical search pattern, apply the at least one query to the volume of data, and carry out a predefined action when the at least one query results in at least one hit in the volume of data or modify the at least one query when the at least one query does not result in at least one hit in the volume of data.

19. A non-transitory computer-readable storage medium having stored therein data representing instructions executable by a programmed processor for editing a volume of data, the storage medium comprising instructions for:
- displaying a subset of the volume of data as a plurality of pre-existing graphical patterns, the plurality of pre-existing graphical patterns representing data points of magnitude over time;
- selecting a portion of the plurality of pre-existing graphical patterns of the subset of the volume of data;
- defining a graphical search pattern with the selected portion of the plurality of pre-existing graphical patterns of the subset of the volume of data;
- generating at least one query based on the graphical search pattern;
- applying the at least one query to the volume of data; and
- carrying out a predefined action when the at least one query results in at least one hit in the volume of data or modifying the at least one query when the at least one query does not result in at least one hit in the volume of data.

* * * * *